United States Patent
Hubacher et al.

(10) Patent No.: US 6,748,525 B1
(45) Date of Patent: Jun. 8, 2004

(54) METHOD AND APPARATUS FOR SENDING BOOT PROGRAMS TO WORKSTATION COMPUTERS OVER A NETWORK IN A CONTROLLED PROCESS

(75) Inventors: Kenneth Hubacher, Cedar Park, TX (US); Dennis Sposato, Austin, TX (US); Philip C. Theiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/451,954

(22) Filed: Nov. 30, 1999

(51) Int. Cl.[7] .......................... G06F 15/177; G06F 9/00
(52) U.S. Cl. ........................ 713/1; 713/2; 713/100; 709/220; 709/221; 709/222
(58) Field of Search .............................. 713/1, 2, 100; 709/220, 221, 222

(56) References Cited

U.S. PATENT DOCUMENTS

| | | | | |
|---|---|---|---|---|
| 5,577,210 A | | 11/1996 | Yoshida et al. .......... 395/200.1 |
| 5,794,031 A | * | 8/1998 | Nakadai ...................... 713/2 |
| 5,842,011 A | | 11/1998 | Basu ....................... 395/652 |
| 5,870,554 A | | 2/1999 | Grossman et al. ..... 395/200.52 |
| 6,052,779 A | * | 4/2000 | Jackson et al. ................ 713/2 |
| 6,373,498 B1 | * | 4/2002 | Abgrall ...................... 345/619 |
| 6,421,777 B1 | * | 7/2002 | Pierre-Louis et al. .......... 713/2 |

FOREIGN PATENT DOCUMENTS

JP 06332716 A * 12/1994 ........... G06F/9/445

OTHER PUBLICATIONS

Lomas, M.; Christianson, B.; "Remote booting in a hostile world: to whom am I speaking? [Computer security]", Computer, vol.: 28 Issue: 1, Jan. 1995, Page(s): 50–54.*

* cited by examiner

Primary Examiner—Thomas Lee
Assistant Examiner—James K. Trujillo
(74) Attorney, Agent, or Firm—David A. Mims, Jr.; Rudolf O. Siegesmund

(57) ABSTRACT

An apparatus and method for controlling boot programs sent by a server computer system to a plurality of client computer systems in response to a plurality of requests by the client computer systems. Specifically, the invention provides for a priority boot, a paced boot or a combination priority and paced boot enabled by a remotely controlled boot process.

22 Claims, 11 Drawing Sheets

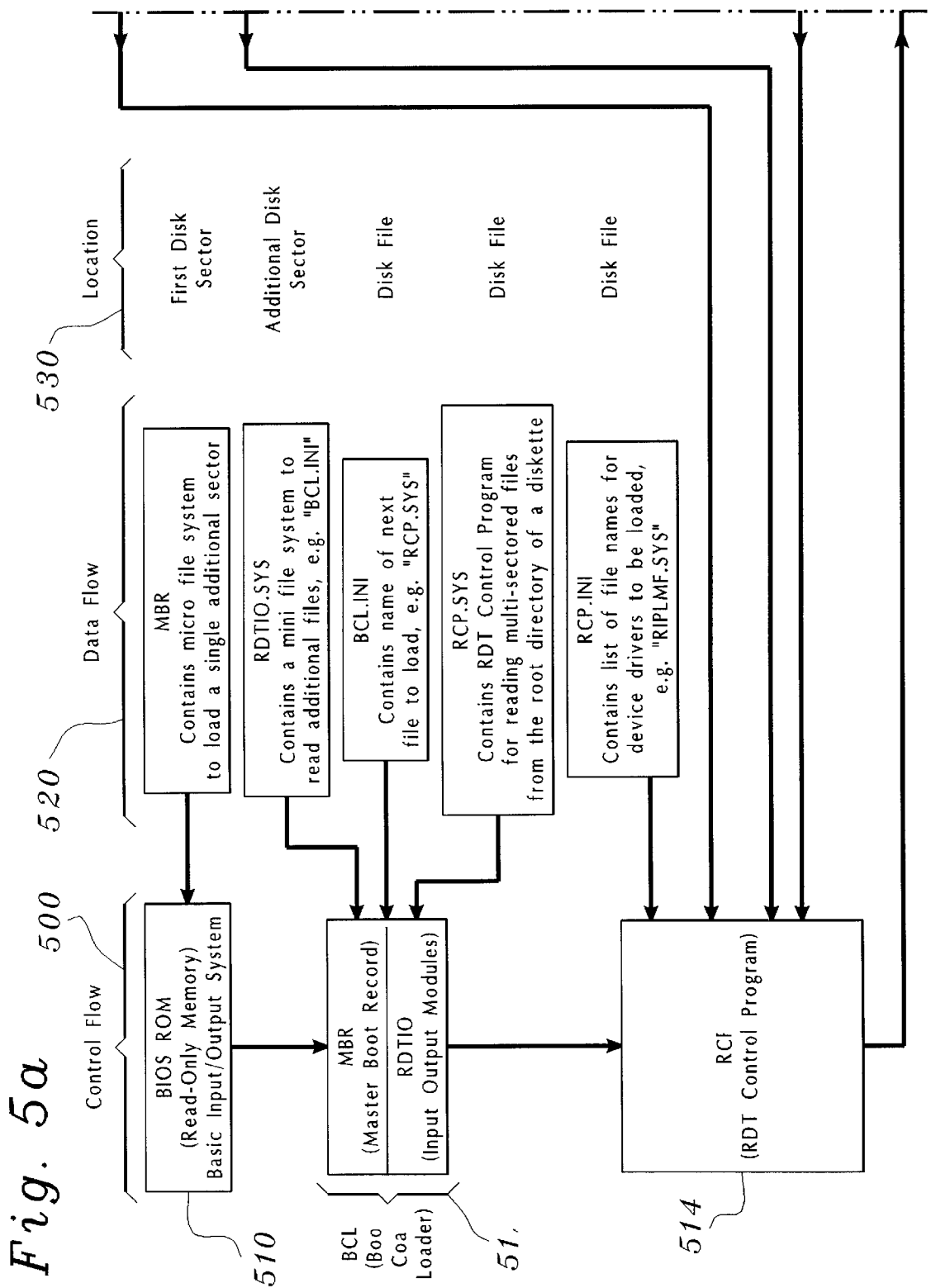

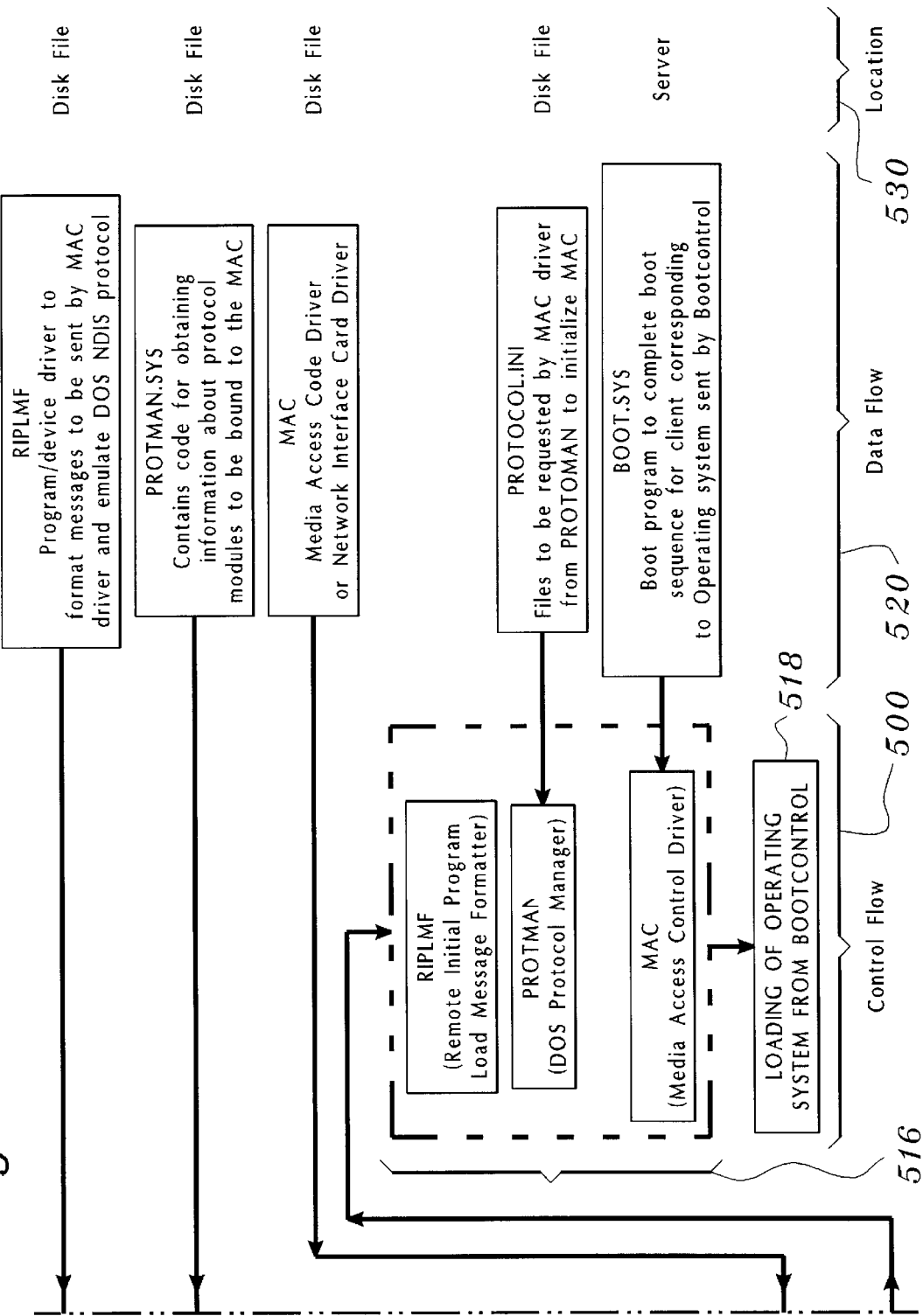

METHOD AND APPARATUS FOR SENDING BOOT PROGRAMS TO WORKSTATION COMPUTERS OVER A NETWORK IN A CONTROLLED PROCESS

FIELD OF THE INVENTION

The present invention relates to an apparatus and method for controlling requests for boot programs to a server computer system by a plurality of client computer systems in a remotely controlled boot environment. Specifically, the invention provides for a priority boot, a paced boot or a combination priority and paced boot enabled by a remotely controlled boot process.

BACKGROUND OF THE INVENTION

A computer or computer system, when turned on, must be prepared for operation by loading an operating system. In the normal operation of a single computer system, when a user issues a boot command to the computer, the computer responds to the boot command by attempting to retrieve the operating system files from the computer systems memory. Configuration data files are also needed to configure the specific machine with the hardware parameters necessary for the specific hardware configuration. These files also contain information needed to initialize video adapters, printers, and peripherals associated with the particular machine. For example, the files would include CONFIG.SYS in the MS-DOS operating system, available from MICROSOFT Corporation.

Computers or computer systems can be connected in a network normally consisting of a client workstation, a server and a central network. In a system where the computer's storage is maintained when the power is turned off, the operating system can be stored in the computer itself In a system where the computer has only storage that is lost when the power is turned off, the computer cannot retrieve the boot information from within the computer itself In that case, the client sends a request for the operating system files via the network to the server acting as a boot server. Even when the client workstation has non-volatile storage capability, it is advantageous to boot from the server because memory space is saved in the workstation computer. As operating system and application programs expand to provide new and greater capabilities, booting from a server can be highly advantageous.

Remote booting of a client workstation from a server is known in the art. U.S. Pat. No. 5,842,011 discloses a method for booting a local workstation from a server where the network is established by sending the operating system to the workstation when the power is turned on at the local workstation. The local workstation then boots from the transferred operating system which is now in its memory. U.S. Pat. No. 5,577,210 discloses a method for booting the local workstation where the operating system is transferred to the local workstation by the server in response to the first interruption produced by a terminal after it is turned on.

Several methods of remote booting exist in the marketplace. One is called Remote Initial Program Load (RIPL). RIPL is the process of loading an operating system onto a workstation from a remote location. The RIPL protocol was co-developed by 3Com, Microsoft, and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process. The client workstation requires a special Read Only Memory (ROM) installed on its (Local Area Network) LAN adapter or Network Interface Card (NIC). The special ROM is known generally as a remote boot ROM, but two specific examples of remote boot chips are the RIPL chip, which supports ANSI/IEEE standard 802.2, and the Preboot Execution Environment (PXE) chip, which is used in the Transmission Control Protocol/Internet Protocol (TCP/IP) environment.

While the process has many advantages for booting a computer that has volatile storage, such as a network computer, the computer is required to have a remote boot ROM on the LAN adapter or Network Interface Card (NIC). The remote boot ROM requirement does not allow any user interaction with the remote boot process. U.S. Pat. No. 6,463,530 discloses a remote boot process that does not require a remote boot ROM on the LAN adapter or NIC.

Existing boot manager configurations allow different partitions to be booted based on the user's choice from a menu at machine start time. The selection criteria for the menu is hard coded on the local machine hard drive. Therefore, changes to the boot manager configuration must be done locally at the machine and normally require a reboot post configuration, a very tedious process in a large enterprise environment involving thousands of machines.

Therefore, a need exists for a remotely controlled boot manager which would allow the administrator to change the boot manager configuration remotely, from a server, and have the workstation pick up those changes every boot. Administrators could then configure items such as what to boot, timeout values, and defaults from a server rather than at the local machine. Thus, a need exists for an apparatus and method in a LAN/WAN environment for remote administration of workstation boot choices.

Workstations that boot across a network such as RIPL or PX)E can create a high demand on the boot server. This demand can over stress the boot server and flood the network causing congestion. A need exists for a way to stagger the booting of these workstations. In other words, a need exists for a method and apparatus to delay the booting of some workstations while others are allowed to boot in order to minimize the incident of peak loads, thus relieving the load on the boot servers and the network congestion.

SUMMARY OF THE INVENTION

The invention meeting the needs identified above is a Controlled Network Boot Process which provides an apparatus and method to allow a server in a LAN environment to control the boot requests from client machines to eliminate congestion on the network. Using the RIPL/PXE Emulation software, it is possible to control the workstations RIPL/PXE process. Just prior to sending out the RIPL Request or the start of the PXE process, the Controlled Network Boot Process (CNBP) would send a frame to a process, on another machine, responsible for monitoring and maintaining a staggered boot sequence. This "server" sided process of the CNBP would be responsible for understanding how to maintain a staggered boot order and would respond to each workstation request appropriately. Additionally, the controlling server can display a menu to the user at the client machine informing the user of the status of the boot activity. The invention is enabled by the Remotely Controlled Boot (RCB) process which comprises a set of programs at the workstation which interacts with the BOOTCONTROL program at the server.

The RCB programs at the workstation allow a remote boot and interaction with the server sided process of the CNBP called BOOTCONTROL. Instructions from a Basic Input Output System (BIOS) ROM are executed to load a Boot Code Loader (BCL) from a nonvolatile, read/write memory, such as a diskette or hard disk. The BCL executes to load a Remote Control Program (RCP) from the diskette, and the RCP executes to load a message program, a protocol manager and/or device drivers from the diskette without loading an operating system. The message program and/or device drivers communicate with a program called BOOTCONTROL in the network server. The program will interface with an NDIS compliant Network Interface Card (NIC) to send out a discovery frame. The discovery frame will be intercepted by BOOTCONTROL installed on the servers which will be running and listening for the request. Once BOOTCONTROL intercepts the request it will send back the boot program or bootcontrol display information informing the client of the approximate time to boot. If the boot device is unavailable and a time-out value and prioritized list is supplied the process will continue to attempt to boot for the amount of time expressed by the value. If time-out expires the next bootable option is attempted. The process continues until a successful boot occurs.

Essentially, there are two programs to the CNBP process. On the client or workstation end, the RCB programs are used. The invention which meets the needs identified above is contained in the BOOTCONTROL program located on the servers that are available for providing boot programs to the client workstations. When the client seeks to boot and turns on the computer, the pre-boot environment will take control of the workstation and, in the case of the staggered boot, send out a frame to a server process to ask permission to continue to boot. The client side will then wait for a reply from the server process to allow it to continue.

The server sided process will listen for these client requests and will manage the traffic in allowing the order and sequence of workstations to boot. Two basic methods are employed. First, a priority boot is employed. Second, a paced boot is employed. A third, method may be employed which combines both the paced boot and the priority boot.

Priority boot requires a known state to be in place for the program to accomplish its end purpose. A known state is defined as a state in which all client stations are attempting to boot at the same time. For example, after a power loss, it is normal to anticipate that when the power is turned back on, most if not all of the client stations will attempt to boot and will make the attempt at the same time or very close to the same time. Given the definition of known state, i.e. all client machines attempting to boot, priorities can be established by the administrator based on customer selection. For example, in a bank branch, the administrator may designate that teller workstations are the highest priority and should be booted first so they can service the customers in line at the bank. The criteria to select a priority consists of a list of machines arranged in groups with a separation time between each group. For example:

Machine 1
Machine 2
Machine 3
120 second time period
Machine 4
Machine 5
Machine 6
120 second time period
Machine 7
120 second time period In this example, Machine 1, 2, and 3 are booted first. 120 seconds later, Machines 4, 5 and 6 are booted. 120 seconds later Machine 7 is booted, and then 120 seconds later any other boot request is satisfied. Unlisted machines can also be booted allowing customers to only list those machines which are really important. Also, new machines that haven't made it to the list will still be able to boot.

Paced boot contrasts with the priority boot in that paced boot works in an unknown state. Unknown state is defined as a state where the administrator does not know which machines will be started and at what times and therefore, cannot determine priorities. However, the administrator still wants to ensure that the server or servers do not become overburdened with an overload of boot request bunching at one point in time. The paced booting program will allow clients simply to boot in the order in which they are received at the server.

Paced boot requires only two parameters, time and the number of workstations. For example:

Time=120
Number=10

In this example, the server process will not allow more than 10 clients in a given time of 120 seconds. Because the administrator doesn't know who or when users will turn on their machines in the "unknown" state the administrator can only pace the amount of clients attempting to boot.

A third option, is available in which the priority method and the paced method are combined. Such a combination allows the booting of the clients to be paced and can also allow prioritization if a client request comes in and is identified as a priority client. In such a case, that request would receive higher priority over any other requests during that period of time allowing that client to be booted before a client with lower priority or no priority at all.

The invention also allows for the server to send the client a message to let the client know what is happening. For example, the message sent from the server might tell the client how many minutes remain until the machines will be allowed to boot. For example, the message may say the following: "Please wait. Your machine will be booted in approximately three minutes."

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts a flow chart of the workstation process.

DETAILED DESCRIPTION OF THE PREFERRED EMBODIMENT

Figure 1:
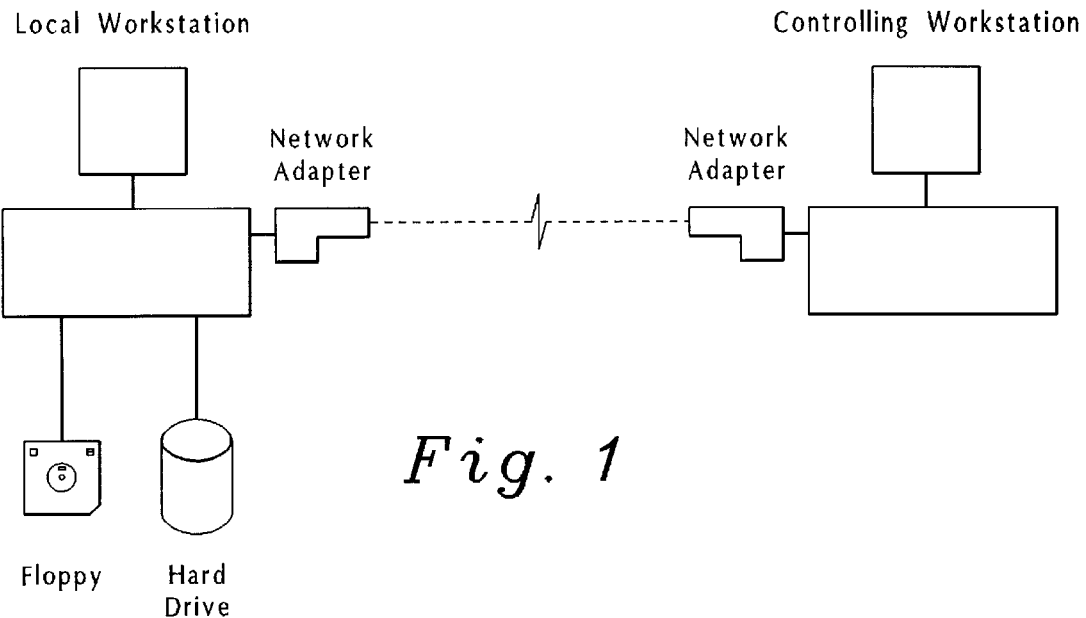
FIG. 1 depicts an overview of the system.

FIG. 1 depicts an overview of the system which involves a controlling workstation and a local workstation, each connected to the other and each having a network adapter.

Figure 1A:
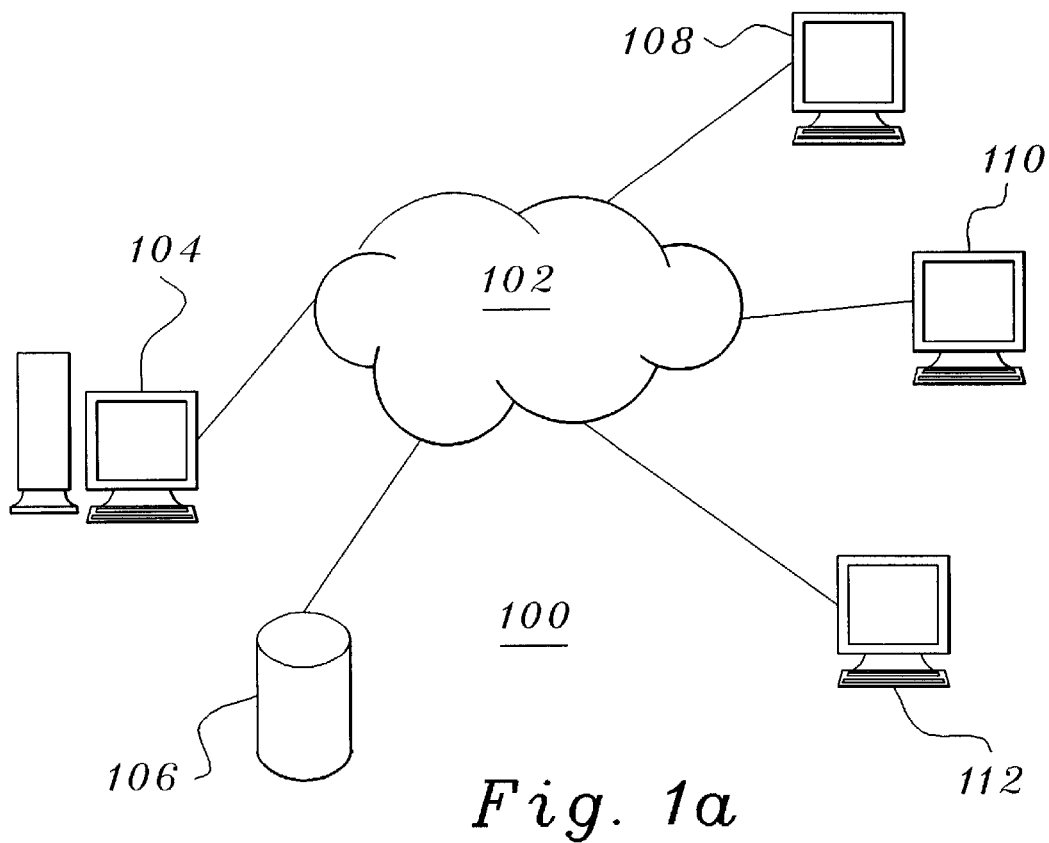
FIG. 1A a distributed data processing system.

FIG. 1A depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

Figure 2:
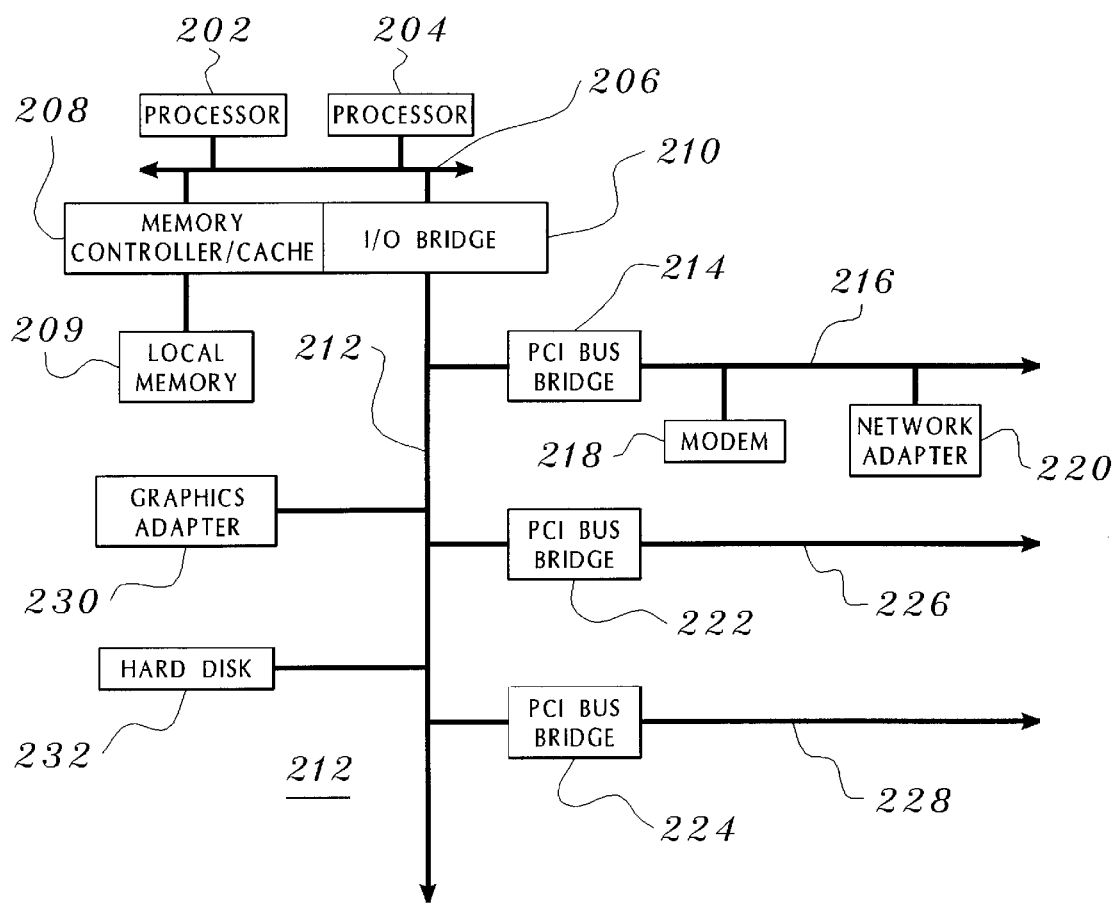
FIG. 2 depicts a block diagram of a server.

For purposes of His application, a network computer is any computer, coupled to a network, which receives a program or other application from another computer coupled to the network. In the depicted example, server 104 provides data, such as boot files, operating system images, and applications to clients 108, 110 and 112. Clients 108, 110, and 112 are clients to server 104. Server 104 may also act as a boot server because it stores the files and parameters needed for booting each of the unique client computers systems 108, 110, and 112. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN). Referring to FIG. 2, a block dial depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. Modem 218 may be connected to PCT bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drive and the like, also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced interactive Executive (AIX) operating system.

Figure 3:
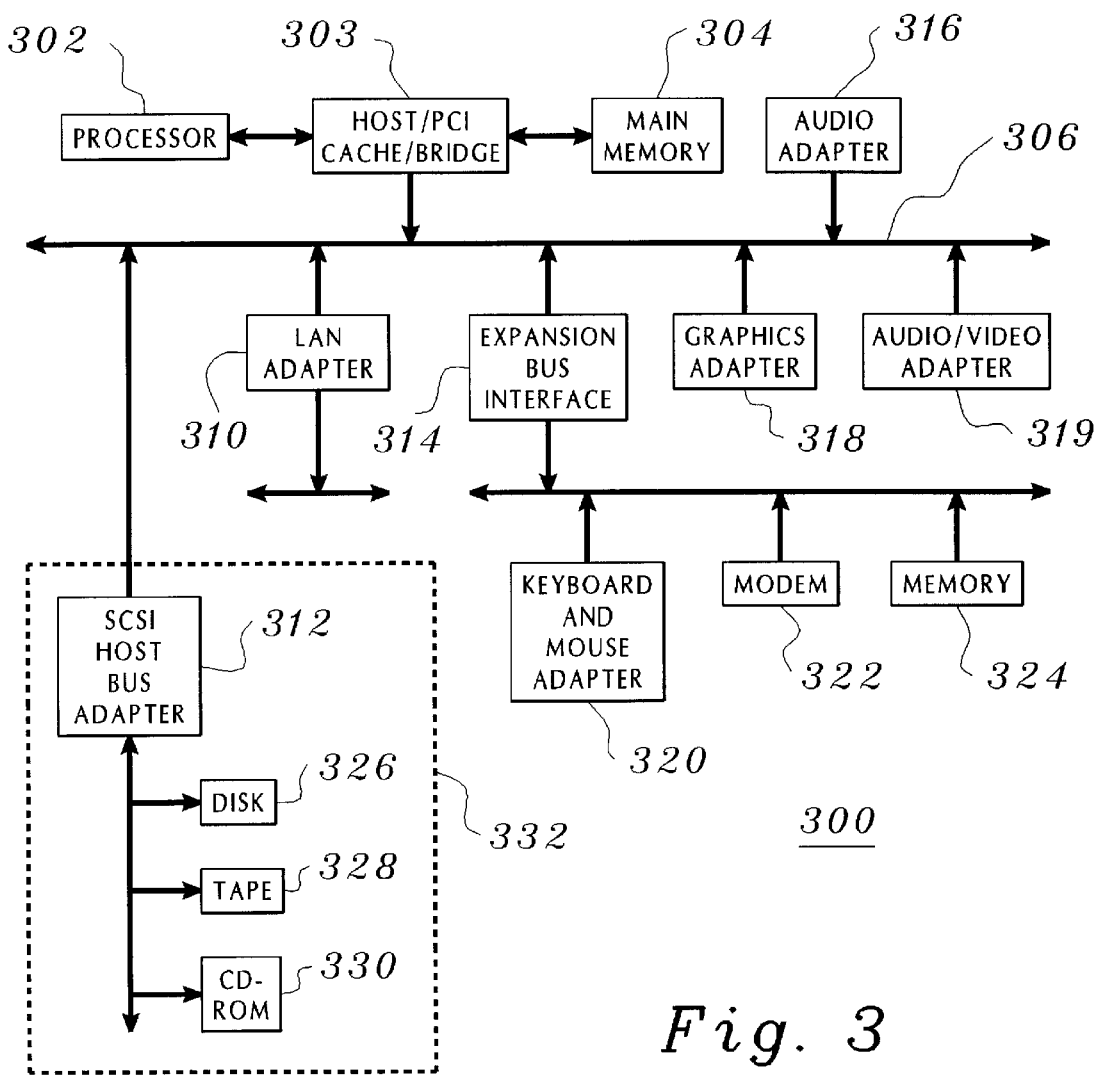
FIG. 3 depicts a block diagram of a work station.

With reference now to FIG. 3, a block diagram illustrates a data processing system in which the Remotely Controlled Boot Manager may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PC bridge 303. PC bridge 308 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data The depicted example in FIG. 3 and above-described examples are not meant to imply architectural limitations with respect to the present invention. It s important to note that while the present invention has been described in the context of a ally functioning data processing system, those of ordinary skill in the art will appreciate that the processes of the present invention are capable of being distributed in a form of a computer readable medium of insertions and a variety of forms and that the present invention applies equally regardless of the particular type of signal bearing media actually used to carry out he distribution. Examples of computer readable media include recordable-type media, such a floppy disc, a hard disk drive, a RAM, and CD-ROMs, and transmission-type media, such as digital and analog communications links.

Figure 4:
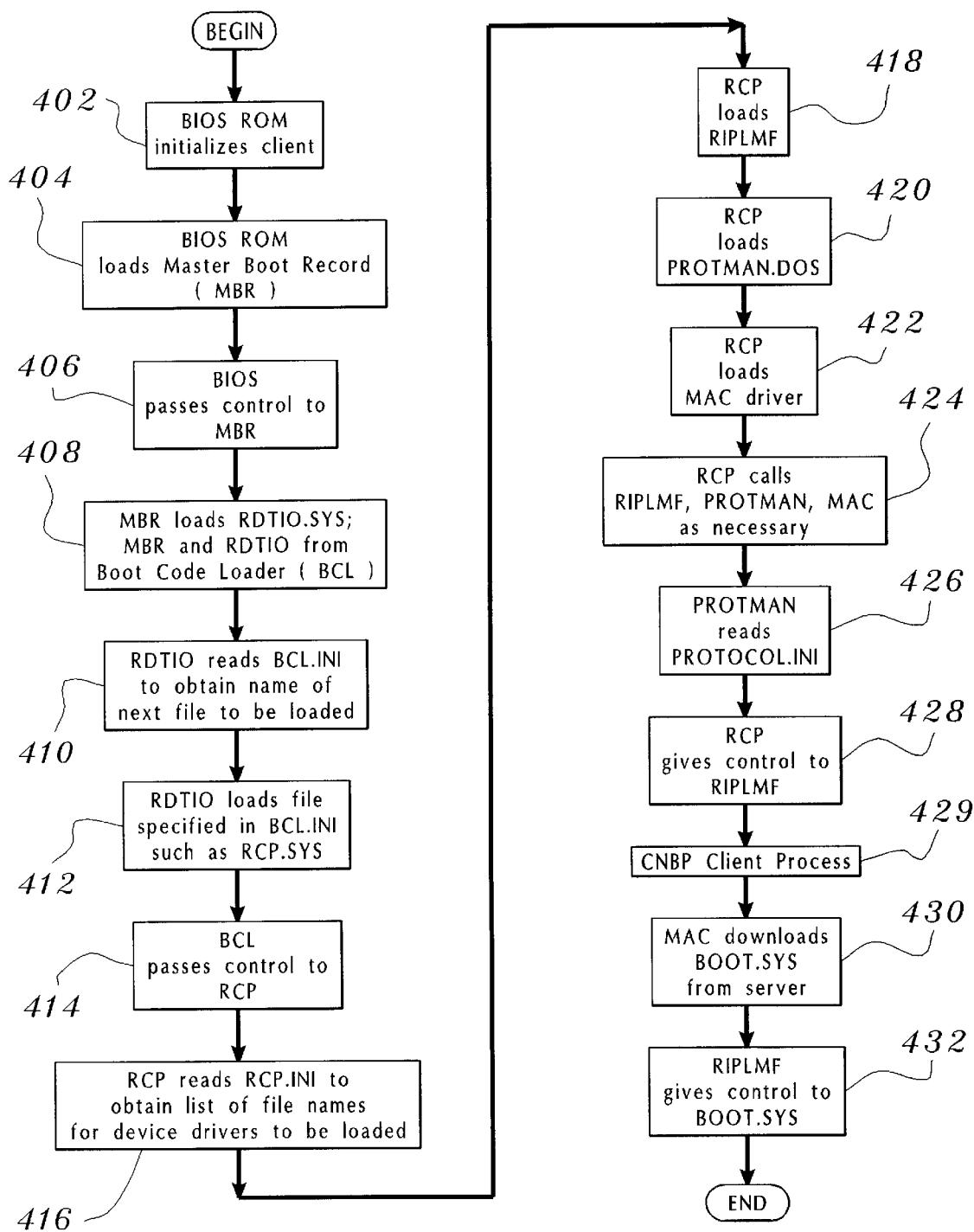
FIG. 4 depicts a flow chart of the workstation process.

With reference now to FIG. 4, a flowchart depicts the steps used in the Remote Client Boot. When a PC is booted, the BIOS ROM chip initializes the system by executing POST (Power-on Self-Test) code and by setting up the BIOS vector tables in low memory and by selecting a boot source (step 402). On newer systems, this is a selectable parameter in the hardware system BIOS setup procedure. If the system has been allowed to select a diskette drive as a boot device, BIOS ROM instructions reads the first sector of the diskette into memory at a predefined location (step 404). This sector is called the Master Boot Record (MBR). The BIOS then gives control to MBR (step 406).

The MBR, Cyl 0, Head 0, Sector 1 of the diskette is the first thing loaded into the client system after POST processing is completed. The MBR module is no larger than 512 bytes and contains the partition boot table for the diskette. The MBR module also contains an identity stamp and a micro file system with the ability to load a RDT Input Output Module (RDTIO) (step 408). The micro file system has the capability of reading one sector of any file contained in the root directory of a diskette employing the 12-bit FAT architecture. The file name for RDTIO is hard-coded in the MBR and is not user-changeable.

RDTIO.SYS is a one sector file that is read into memory by the MBR. Together, the RDTIO and the MBR make up the BCL. RDTIO adds enough capability to the file system to allow reading additional files.

The first file read by BCL is its initialization file. This file, BCL.INI, contains the name of a self loading, multi-sectored file that can be found in the root directory of the diskette. When this file is successfully read into memory, it will be give control and BCL will no longer be required. The syntax for the BCL.INI file is very restrictive. There are only two parameters in capital letters. The parameters are the name of the file to load and the address of the desired location. For example, RCP.SYS,0000:7C00. This instructs the BCL to load file RCP.SYS at location 000.7C00 in real memory. There is no error checking so the file must be in the root directory of the diskette. If the address field is optional, the 7C00 is the default. However, if the address field is used, the address field allows the BCL to load images directly into memory from the disk or diskette. The file name must start at the first location in the file.

BCL.INI contains the name of the next file to load (step 410). BCL.INI specifies a file that contains a self-supporting program or module, as it will be given control at a predetermined area and BCL will terminate execution, leaving the newly loaded module on its own. In RCB's case, this file's name is RCP.SYS-RDT, or the "RDT Control Program" which consists of RCP.SYS and RCP.INI. The RCT Control Program is loaded by the BCL. Once loaded, there is no longer any dependency on the BCL for services. The RCP contains its own mini file system consisting of enough logic to read multi-sectored files from the root directory of a diskette which is formatted using 12-bit FAT architecture.

RDTIO loads RCP.SYS (step 412) and passes control to RCP (step 414). RCP's task is to load additional files, such as device drivers, provide DOS function emulation in support of these drivers, and load other components of RCB, specifically the RIPL Message Formatter (RIPLMF). RCP receives its instructions from an .INT file called RCP.INI (step 416) in the root directory of the diskette. These instructions are in the form of file names. RCP.INI will be parsed and displayed on the console as it is used. The purpose of the INI file is to tell RCP which drivers it needs to load to support the particular NIC on the system in which it is running. The RCP also has the responsibility of providing DOS function emulation to the device drivers when they are in their initialization routines. RCP allows the device drivers to execute as though they were in a real DOS environment. RCP further allows different drivers to be loaded for individual NICs without forcing source code changes in the RCP. The syntax is:

msgf=[file name] where "file name" is the name of any "Message Formatter" that is to be used for this boot, i.e.: "msgf=riplmf.sys".

load=[file name] where "file name" is the name of any module that has to be loaded to make RCB work. At a minimum, the DOS device drivers, for the NIC in the machine, must be identified this way, i.e.: "load=device.sys".

ip=[ip address] where "ip address" is the dotted decimal IP address, i.e.: ip=123.456.789.012."

mac=[mac address] where "mac address" is the 12 hex digit MAC address in a continuous string, i.e.: mac=001122334455".

Each entry must be separated by any, or all, of the following characters:

20h=Space

0ah=Carriage return

0dh=line feed

Almost any editor can be used to create the file.

RIPLMF is loaded first (step 418) followed by the device drivers. The DOS Protocol Manager (PROTMAN.DOS) is usually loaded next (step 420) followed by the NIC driver, also referred to as the MAC driver (step 422). The RCP will call each driver (step 424), in turn, allowing it to perform its initialization routines, open files, display messages, etc. PROTMAN.DOS will request a file called PROTOCOL.INI to be read in during this time (step 426). This file is requested by the MAC driver from PROTMAN.DOS during an inter-module conversation when the MAC is initialized. The MAC causes messages to be sent and received on the LAN.

PROTMAN.DOS is the DOS protocol manager device driver. According to the NDIS specification, "the Protocol Manager reads the PROTOCOL.INI file at INIT time and parses it to create the configuration memory image passed to the protocol modules." The RCB uses it for just that purpose. The MAC driver will issue Input/Output Controls (IOCTLs) to PROTMAN.DOS to get this information, as well as information about the protocol drivers that wish to be bound to it. RIPLMF presents itself to PROTMAN.DOS as though it were a protocol driver requesting to be bound to the MAC. This is done by placing entries in the PROTOCOL.INI file which make RIPLMF look like a protocol driver and through IOCTL calls from RIPLMF to PROTMAN.DOS. RCB emulates most of the other additional BindAndStart and InitiateBind logic which, in a DOS environment, comes from additional support programs. These programs are unnecessary in the RCB system.

The PROTOCOL.INI file used by RCB can be the same one that is included in the BOOT.SYS image assembled in the server with some minor changes. RIPLMF has to be added to it as follows:

[RIPLMF-MOD]
Driver Name=RIPLMF$
Bindings=ELPC3

The "Bindings=" statement must point to the MAC driver, in this case ELPC3. The example above was taken from the PROTOCOL.INI used with the 3Com 3C589 PCMCIA Ethernet card.

The entire file looks like this:

[protman$]
    Driver name=protman$
[ELPC3]
    Driver name=ELPC3$
    PCMCIA_ENABLER=YES
[RIPLMF-MOD]
    Driver name=RIPLMF$
    Bindings=ELPC3

The device drivers used by RCB are also called ANSI/IEEE standard 802.2 drivers. RCB requires the drivers specific to the DOS environment. The EL90X.DOS is used to support the #Com3C509 PCI Ethernet card. The ELPC3.DOS driver supports the 3Com#C589 PCMCIA Ethernet card.

When all initialization is complete, RIPLMF is given control (step 428), and the services of RCP are no longer required. RIPLMF is a hybrid application program and NDIS protocol device driver. It follows the NDIS specification in its actions with both PROTMAN.DOS and the MAC driver. RIPLMF's relationship to these two other programs is that of a protocol driver; however, RIPLMF also "formats" messages and present them to the MAC for delivery. Since the other drivers must be made to believe they are working in an NDIS environment, RIPLMF also does emulation in two areas, "BindAndStart" and "InitiateBind." According to NDIS, a protocol driver must be bound to a MAC driver. Therefore, RIPLMF binds to the MAC such that the MAC cannot tell the difference between RIPLMF or a DOS NDIS protocol driver.

RIPLMF will carry on a conversation with the MAC, requesting it to send certain messages out on the LAN. The MAC will communicate with the server to obtain the boot block from the program called BOOTCONTROL in the network server. Step 429 is the execution of the CNBP client process which consists of establishing communication with the network server and receiving a bootcontrol display message. RIPLMF asks the MAC to send: "Find." The "Find" message is interpreted by the BOOTCONTROL program on the network server as a request for permission by the client to continue to boot. The find message is replied to by a "Found" from the server. The CNBP client process will wait for a reply from the server. If the "Found" message is received, then the CNBP client process proceeds on the basis that communications with the network server have been established. The BOOTCONTROL program in the server will send an operating system and bootcontrol display information informing the client of the approximate time to boot.

When all segments of programs sent by the server have been received, RIPLMF resets any vectors that may have been used by RCP and the other drivers, and gives the system over to the programs sent by the network server. At this point no components of RCP are required, nor can they be found in the system. The find/found dialog is based on an address that NDIS calls the Permanent Station Address. This address, which is hard wired into the NIC itself, becomes part of the outgoing message.

When the operating system has been downloaded (step 430), RIPLMF will perfume some housekeeping routines and gives control to BOOT.SYS (step 432). BOOT.SYS then completes the boot process to load an operating system from the network server. If the boot device is unavailable the process will continue to attempt to boot for the amount of time expressed in a time-out value set in BOOTCONTROL. When the time expires the next bootable option will be attempted. If no time out value is supplied then the bootcontrol message is displayed immediately after a boot failure. BOOTCONTROL is the controlling mechanism that interacts with each and every client request for a boot program. The network interface between the client and BOOTCONTROL may be IP based which means that the machine BOOTCONTROL, the bootcontroller, is running on must also be running TCP/IP. BOOTCONTROL receives a User Datagram Protocol (UDP) datagram request from the client and sends back the information in a UDP packet. One implementation would be written in JAVA. BOOTCONTROL could be run on any platform that has a JVM and is TCP/IP enabled The following languages are suitable for the programs Assembler, C, C++, Cobol, Pascal, Java, SmallTalk, Perl, Rexx, LISP, APL, BASIC, PLI, PLII. The following protocols are suitable: NETBIO; TCP/IP; 802.2; SNA, SNB, IPX and APPLETALK.

Everything that occurs in the workstation computer is based on the MAC address, which is a hardware name embedded in the chip. A server on the LAN that recognizes the client computer's MAC address will respond in a predetermined way. The RCB allows a selection of MAC addresses that can provide different boots for different uses. Therefore, the RPL/PXE Emulation of the first programs further allows the option of remote booting of multiple operating systems. For example, with the RPL/PXE emulation and its ability to alias the MAC address, the BOOTCONTROL can offer different operating systems from the same server, different operating systems from different servers, different versions of the same operating system from the same server and different versions of the same operating system from different servers. Moreover, BOOTCONTROL can be offered from a primary server, a backup server or a different server. Additionally, BOOTCONTROL can present different workstation functions.

With reference now to FIG. 5, a flowchart depicts the control flow, the data flow, and the location of data and instructions used in the Remote Client Boot. This figure provides a slightly different perspective compared with FIG. 4, showing the manner in which files are loaded and then the order in which the code segments within the files obtain control. Control flow 500 shows the manner in which a program, device driver, or set of instructions passes control from one component to another. A generalized sequence of steps performs part of the boot sequence of the client, and each step completes a portion of the sequence before relinquishing control to the next portion Each of these components comprises instructions that are executed to perform a set of functions. BIOS ROM 510 initializes the client, loads BCL 512, and passes control to BCL 512. As shown, BCL 512 may contain a plurality of components that are not necessarily executed sequentially before relinquishing control. Once BCL 512 has loaded RCP 514, BCL 512 passes control to RCP 514, which loads components 516, which may contain programs and/or device drivers. RCP 514 may direct control of components 516 or may pass control to components 516, which are not necessarily executed sequentially. Once operating system 518 sent by BOOTCONTROL has been retrieved from the server, control of the client computer is relinquished to operating system 518, which then proceeds to complete the boot process for the client. Data flow 520 shows the data or set of instructions which are loaded by the software components shown as control flow 510. Although the components in data flow 520 have been given names, these file names may be used for representative purposes only. Other configurations of components in data flow 520 may also be incorporated, and the depicted example in FIG. 5 is not meant to imply configural limitations with respect to the present invention. Locations 530 provide information on the source location for the components in data flow 520.

Figure 6:
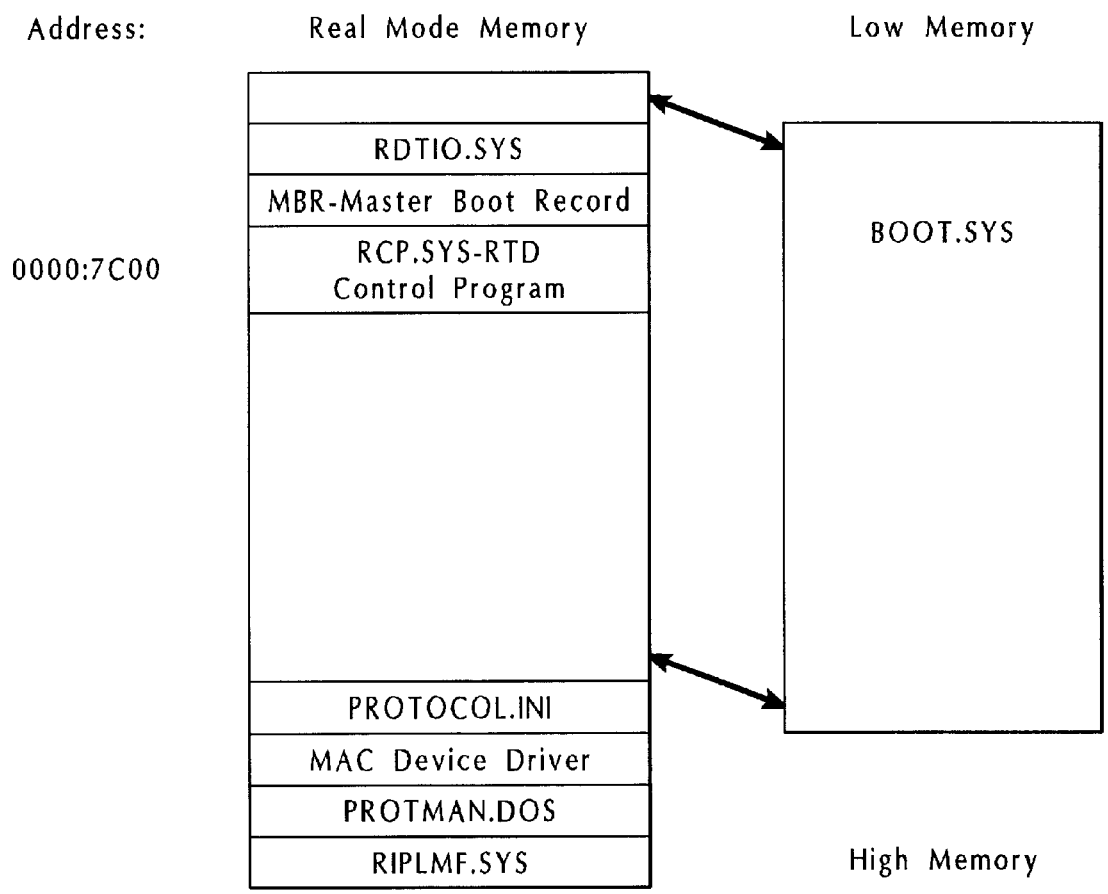
FIG. 6 depicts a diagram of workstation memory.

With reference now to FIG. 6, a block diagram depicts a memory map of real mode memory in a 80×86 machine as used in the present invention. Virtually all PC's in use today allow real mode addressing from location zero (0000:0000) to 640 k (AOOO:0000). The diagram shows that the BCL, consisting of the MBR and RDTIO, locate themselves in low storage, and load RCP.SYS at location 0000:7COO. This is actually a predefined location where code will be loaded by the BIOS when booting from a diskette. RCP then loads all required modules into the highest addresses possible. This is done so that the BOOT.SYS files sent by BOOTCONTROL can be loaded in low memory at the operating systems own requested location. When all drivers have been loaded and initialized, RCP gives control to RIPLMF in high memory and is no longer required. RIPLMF will load BOOT. SYS over all of RCB's code in low memory. This can be done because all DOS emulation, which was done by the RCP, is no longer required. RIPLMF acts as both an application program and NDIS protocol device driver. As such, there is a guarantee that DOS emulation will not be necessary.

Figure 7:
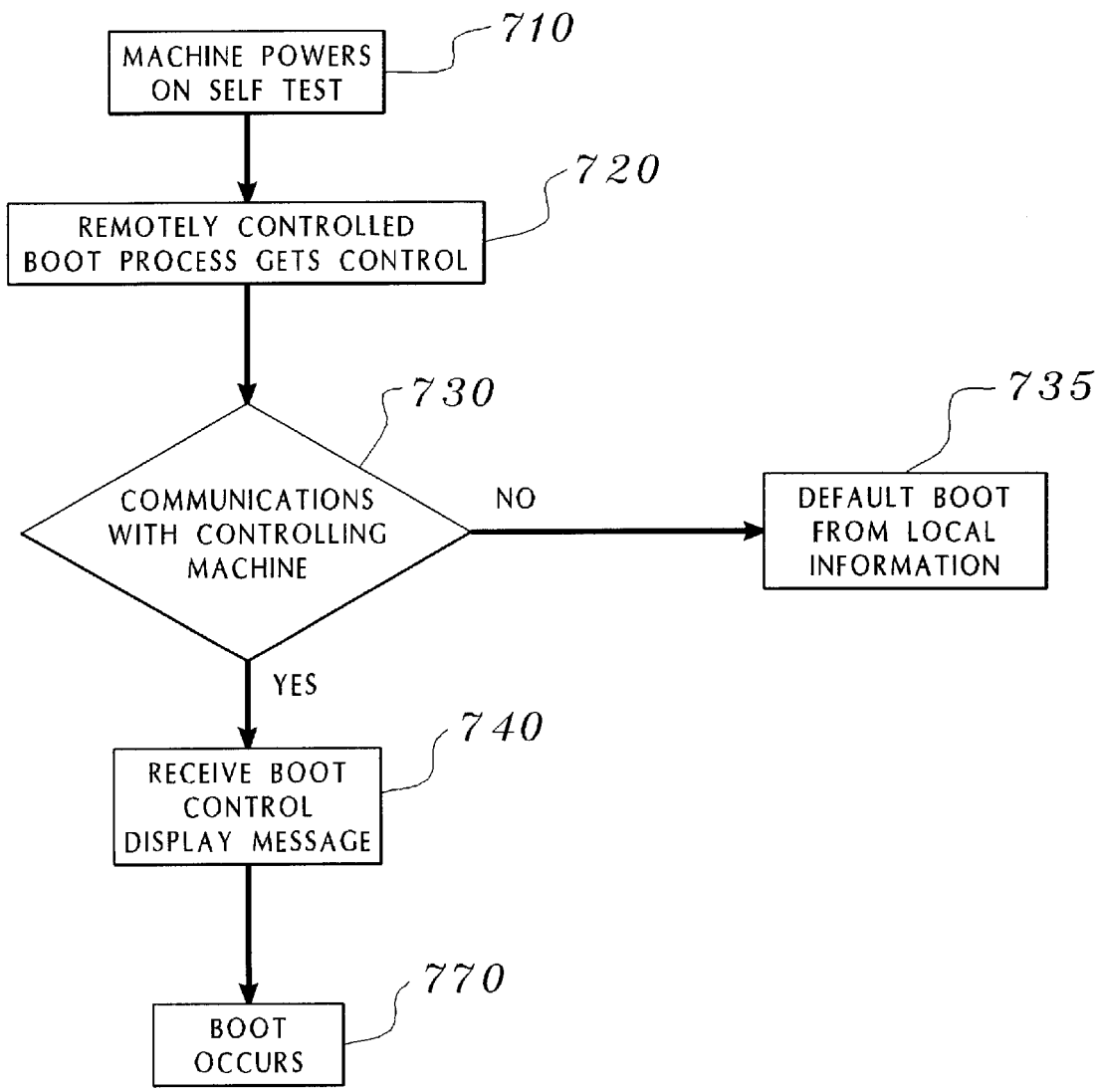
FIG. 7 depicts a flow chart of the workstation process.

FIG. 7 depicts the process at the workstation. The first step is the Mache Power On Self Test (POST) (710). The Machine is powered on and goes through its standard power on testing before giving control to the boot manager process. Next, at the workstation, the Remotely Controlled Boot (RCB) programs get control (720) and attempts to communicate with the controlling server for the necessary boot information (730). If contact is made with the controlling server it will result in the receipt of the BOOTCONTROL display message (740). If contact cannot be made with the boot server, the local default boot information, for that workstation, will be used (735). if contact is made, the actual boot of the system occurs (770).

Figure 8:
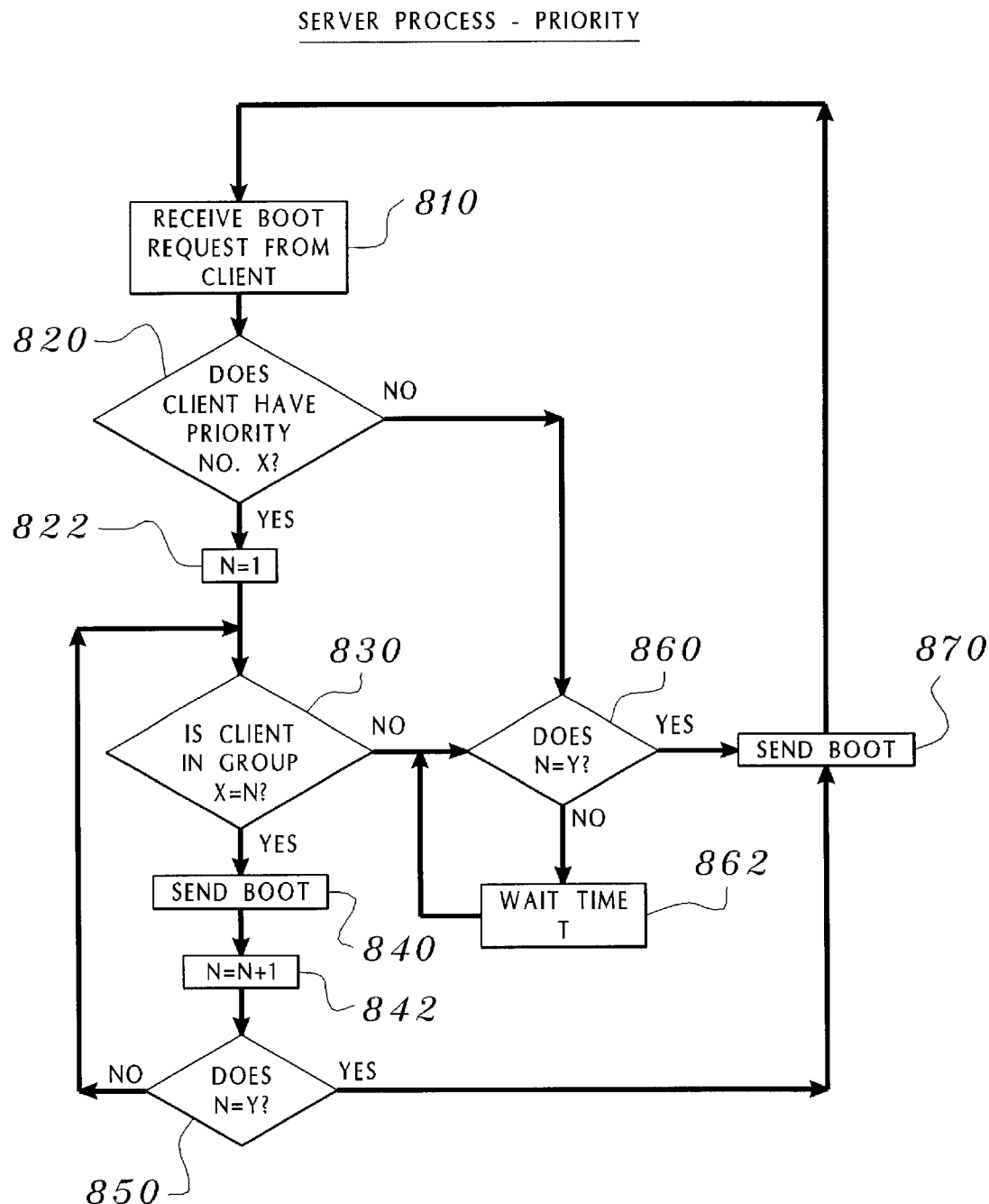
FIG. 8 depicts a flow chart of the server process for priority boot.

FIG. 8 shows the server process implementing the priority method. The server receives a boot request from the client workstation (810) and the program determines whether the client has a priority number, in this case designated by the variable "x" (820). In the first iteration, x will be equal to 1. If the determination is "yes" then the next step is to initialize the variable "n" to 1 (822). Next the program determines if the client number is in the group where "x" equals "n" (830). If the determination is "yes" then the server sends the boot program to the client machine which has been enabled to receive the boot program by the remotely controlled boot process disclosed in FIGS. 4 through 6. Next, the variable "n" is incremented by 1 integer by setting n=n+1 (842). Next the program determines if "n" equals "y" where "y" is a number assigned by the administrator as the highest priority number (850). Step 850 is necessary to establish when all priority workstations have been booted so that workstations that have not been assigned a priority number can be booted. If "n" does not equal "y" then the program returns to just before step 830 and continues to cycle until "n" equals "y". Returning to step 830, if the program determines that "x" does not equal "n" then the program proceeds to step 860 to determine if "n" equals "y" If "n" equals "y" then all of the priority workstations have been booted and the workstation can be booted at step 870. Likewise, at step 850, if "n" equals "y" all of the priority workstations have been booted and the program will go to step 870 and send the boot program to the workstation. The program then returns to just prior to step 810 and receives the next boot request to be processed. At step 830, if the program determines that the client is not in the group where the client number is equal to n, i.e. the priority number to be processed, the program goes to step 860 to determine if "n" equals "y". If "n" does not equal "y" then the program proceeds to step 862 and waits time "t". Time "t" is assigned by the administrator. After waiting time "t" the program returns to just before step 860 to see if all of the priority programs have been processed.

Figure 9:
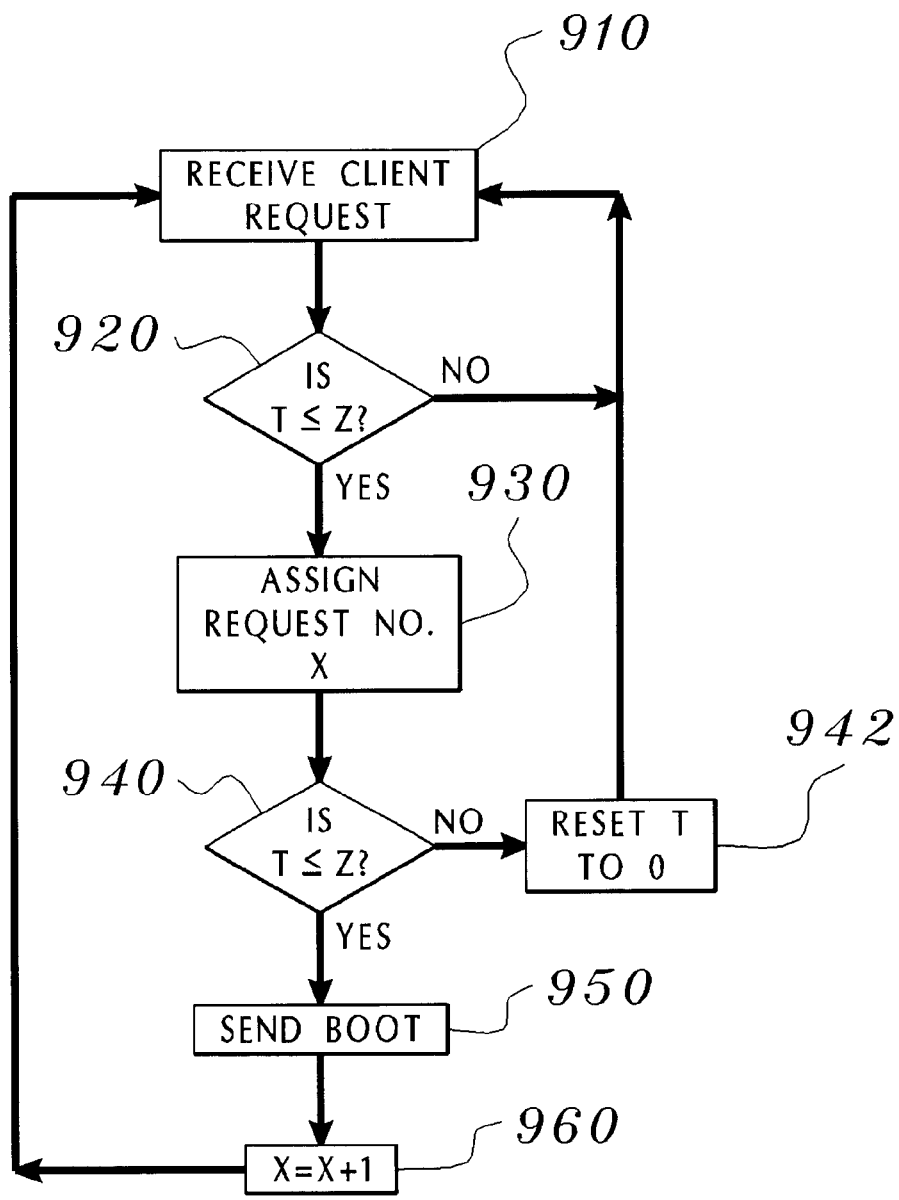
FIG. 9 depicts a flow chart of the server process for paced boot.

FIG. 9 shows the flow diagram for the paced method program. In the paced method, the server receives the client request (910). Next the program determines if variable "t" is equal to or less than variable "z" (920). The variable "t" is time elapsed since the first request. Variable "z" is the time assigned by the administrator during which a set number of requests will be processed. For example "z" could be set to 120 seconds. If "t" is less than or equal to "z" then the program will proceed to assign request number "x" to the client request (930). Next the program will determine if "x" is less than or equal to "y" (940) where "y" is the number set by the administrator as the maximum number of boot requests to process in time "t". If "x" is less than or equal to "y" then the server Mil send the boot program to the client workstation (950). Next "x" is incremented by the integer 1 (960) and the program returns to receive the next client request. When "x" has been incremented to reach the value "y", step 940 will send the program to step 942 which will reset the "t" to 0 and return the program to step 910 to receive the next client request.

Figure 10:
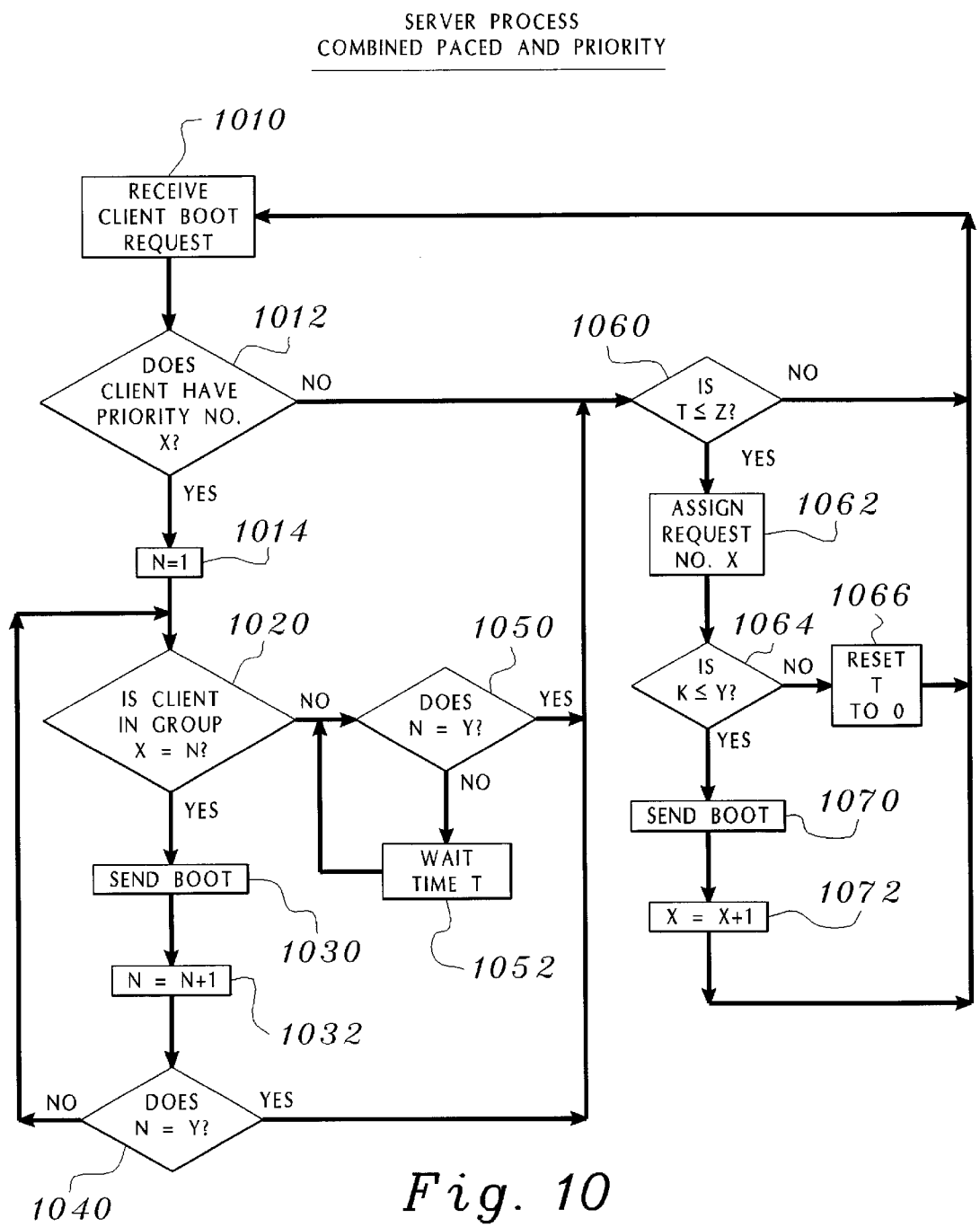
FIG. 10 depicts a flow chart for the server process for combined boot.

FIG. 10 shows the combined priority and paced method. The server receives a boot request from the client workstation (1010) and the program determines whether the client has a priority number, in this case designated by the variable "x" (1012). If the determination is "yes" then the next step is to initialize the variable "n" to 1 (1014). Next the program determines if the client number is in the group where "x" equals "n" (1020). In the fist iteration, "x" will be equal to 1. If the determination is "yes" then the server sends the boot program to the client machine (1030). which has been enabled to receive the boot program by the Remotely Controlled Boot (RCB) process disclosed in FIGS. 4 through 6. Next, the variable "n" is incremented by 1 integer by setting n=n+1 (1032). Next the program determines if "n" equals "y" where "y" is a number assigned by the administrator as the highest priority number (1040). Step 1040 is necessary to establish when all priority workstations have been booted so that workstations that have not been assigned a priority number can be booted If "n" does not equal "y" then the program returns to just before step 1020 and continues to cycle until "n" equals "y". Returning to step 1020, if the program determines that "x" does not equal "n" then the programs proceeds to step 1050 to determine if "n" equals "y" If "n" equals "y" then all of the priority workstations have been booted and the program proceeds to step 1060. Likewise, at step 1040, if "n" equals "y" all of the priority workstations have been booted and the program will go to step 1060. At step 1040, if the program determines that the client is ill not in the group where the client number is equal to "n", i.e. the priority number to be processed, the program goes to step 1050 to determine if "n" equals "y". If "n" does not equal "y" then the program proceeds to step 1052 and waits time "t". Time "t" is assigned by the administrator. After waiting time "t" the program returns to just before step 1050 to see if all of the priority programs have been processed.

The program goes to step 1060 to determine if the variable "t" is equal to or less than variable "z" (1060). The variable "t" is time elapsed since the first request Variable "z" is the time assigned by the administrator during which a set number of requests will be processed. For example "z" could be set to 120 seconds. If "t" is less than or equal to "z" then the program will proceed to assign request number "x" to the client request (1062). Next the program will determine if "x" is less than or equal to "y" (1064) where "y" is the number set by the administrator as the maximum number of boot requests to process in time "t". If "x" is less than or equal to "y" then the server will send the boot program to the client workstation (1070). Next "x" is incremented by the integer 1 (1072) and the program returns to step 1010 to receive the next client request. When "x" has been incremented to reach the value "y", step 1064 will send the program to step 1066 which will reset time "t" to 0 and return the program to step 1010 to receive the next client request.

The advantages provided by the present invention should be apparent in light of the detailed description provided above. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles and practical application of the invention, and to enable others of ordinary skill in the art to understand the invention for various embodiments with various modifications as are suited to the particular use contemplated.

What is claimed:

1. A method for controlling the booting of a plurality of workstation computers having a set of RCB programs from one or more server computers having a BOOTCONTROL program comprising the steps of:

responsive to receiving a plurality of requests for an operating system from the plurality of workstation computers, determining whether each of the workstation computers has a priority number; and responsive to determining that a workstation computer has a priority number, sending a boot program to the workstation computers based on the priority number according to instructions from the BOOTCONTROL program.

2. The method of claim 1 further comprising the step of:

responsive to determining whether each of the workstation computers has a priority number, sending a display message to each of the workstation computers.

3. The method of claim 1 wherein the BOOTCONTROL program employs a combined priority boot and paced boot, wherein the paced boot boots a number of workstation computers in a time period.

4. The method of claim 1 wherein the priority number is independent of any client-server relationship.

5. A programmable apparatus for controlling the booting of a plurality of workstations by one or more servers comprising:

programmable hardware comprising;
at least one server computer; and
a plurality of workstation computers;
a plurality of network interface cards connected to said programmable hardware;
a network connecting said server computer and said workstation computers;
a set of RCB programs installed on said workstation computers;
a BOOTCONTROL program installed on said server computer;
wherein, responsive to receiving a request for an operating system from a plurality of workstation computers, said server computer boots said workstation computers based on a paced boot according to instructions from said BOOTCONTROL program; and
wherein the paced boot boots a number of workstation computers in a time period.

6. The apparatus of claim 5 wherein said BOOTCONTROL program sends a display message to each of said workstation computers.

7. The apparatus of claim 5 wherein the BOOTCONTROL program employs a priority boot, wherein the priority boot boots the workstation computers based on a priority number.

8. The apparatus of claim 5 wherein the BOOTCONTROL program employs a combined priority boot and paced boot.

9. The programmable apparatus of claim 5 wherein said workstation computers are booted according to a priority number and the priority number is independent of any client-server relationship.

10. A computer readable memory in a server computer for controlling the sending of operating systems to a plurality of workstation computers having a set of RCB programs comprising:

a server computer readable storage medium;
a computer program stored in said storage medium; and
the storage medium, so configured by said computer program, responsive to a request from one or more workstation computers, causes the server computer to control the booting of the one or more workstation computers according to either a priority boot, a paced boot, or a combined priority and paced boot;

wherein the server computer boots the workstation computers based on the priority number; and wherein the paced boot boots a number of workstation computers in a time period.

11. The computer program of claim 10 wherein said computer program farther causes a display message to be sent to said workstation computers.

12. The computer readable memory of claim 10 wherein said workstation computers are booted according to a priority number and the priority member is independent of any client-server relationship.

13. A computer implemented process to accomplish controlled booting of a plurality of workstation computers from a network server computer comprising:

using a workstation computer having a set of RCB programs, performing the following series of steps:
powering the workstation computer;
obtaining control of the workstation computer by means the set of RCB programs;
executing, without an operating system, the set of RCB programs to communicate with a network server;
communicating a request to said network server;
receiving a boot program from said network server computer;
booting the first computer from said boot program;

using a server computer having a BOOTCONTROL program, performing the following series of steps:
responsive to the request from the workstation computer, determining if the workstation computer has a priority number, and
responsive to determining that the workstation computer has a priority number, sending a boot program to said workstation computers based on the priority number according to instructions from the BOOTCONTROL program.

14. The computer implemented process of claim 13 wherein the priority number is independent of any client-server relationship.

15. A method for controlling at a server computer, the timing and ordering of booting of a plurality of client computers, the method comprising the computer implemented steps of:

executing instructions from a client computer first memory to load a boot code loader from a client computer second memory, wherein the client computer first memory is a BIOS ROM and the client computer second memory is a nonvolatile, read/write memory;

executing the boot code loader to load a control program from the client computer second memory;

executing the control program to load a set of programs from the client computer second memory without loading an operating system;

executing the set of programs to communicate a message to a network server;

responsive to receiving said message at the network server, executing a BOOTCONTROL program that boots the workstations computers using a paced boot; and wherein the paced boot boots a number of workstation computers in a time period.

16. The method of claim 15 further comprising the step of responsive to instructions from said BOOTCONTROL program implementing a priority boot, wherein the priority boot boots the workstation computers based on a priority number.

17. The method of claim 15 further comprising the step of responsive to instructions from said BOOTCONTROL program implementing a combined priority and paced boot.

18. The method of claim 15 wherein said client computers are booted according to a priority number and the priority number is independent of any client-server relationship.

19. A computer program product on a computer-readable medium for controlling the booting of a plurality of client computers without an operating system, the computer program product comprising:

first instructions from a first memory for loading a set of programs from a second memory, wherein the first memory is a BIOS ROM and the second memory is a nonvolatile, read\write memory;

second instructions in a set of RCB programs for communicating a request to a network server;

third instructions in a BOOTCONTROL program in the network server for determining when to send an operating system to the client computer;

fourth instructions in the set of RCB programs for retrieving the operating system from the network server;

fifth instructions for initiating execution of the operating system based on a paced boot; and wherein the paced boot boots a number of workstation computers in a time period.

20. The computer program product of claim 19 wherein the BOOTCONTROL program employs a priority boot, wherein the priority boot boots the workstation computers based on a priority number.

21. The computer program product of claim 20 wherein the BOOTCONTROL program employs a combined priority boot and paced boot.

22. The computer program of claim 19 wherein said client computers are booted according to a priority number and the priority number is independent of any client-server relationship.

* * * * *

UNITED STATES PATENT AND TRADEMARK OFFICE
CERTIFICATE OF CORRECTION

PATENT NO.    : 6,748,525 B1
DATED         : May 26, 2005
INVENTOR(S)   : Hubacher et al.

It is certified that error appears in the above-identified patent and that said Letters Patent is hereby corrected as shown below:

Drawings,
Sheet 2, FIG. 2, the reference numeral "212" should be -- 200 --
Sheet 5, FIG. 5a, the parenthetical following BCL, "Boo Coa Loader" should read -- Boot Code Loader --
Sheet 5, FIG. 5a, the reference numeral "51" should be -- 512 --
Sheet 5, FIG. 5a, in the box indicated by reference numeral 514, "RCI" should be -- RCP --
Sheet 10, FIG. 9, in the decision block indicated by reference numeral 940, "T≤ Z" should be -- $X \leq Y$ --
Sheet 11, FIG. 10, in the decision block indicated by reference numeral 1064, "K ≤ Y" should be -- $X \leq Y$ --

Column 1,
Lines 36 and 39, "itself" should be -- itself. --

Column 2,
Line 48, "PX)E" should be -- PXE --

Column 5,
Line 35, "His" should be -- this --
Line 54, "dial" should be -- diagram --

Column 6,
Line 35, "PC" should be -- PCI -- (both occurrences)

Column 7,
Line 28, "ally" should be -- fully --
Line 32, "insertions" should be -- instructions --
Line 34, "he" should be -- the --

Column 10,
Line 14, "perfume" should be -- performs --
Line 49, "enabled" should be -- enabled. --

Column 11,
Line 62, "Mache" should be -- Machine --

Column 12,
Line 5, "if" should be -- If --
Line 29, ""y"" should be -- "y". --

UNITED STATES PATENT AND TRADEMARK OFFICE
CERTIFICATE OF CORRECTION

PATENT NO. : 6,748,525 B1
DATED : May 26, 2005
INVENTOR(S) : Hubacher et al.

It is certified that error appears in the above-identified patent and that said Letters Patent is hereby corrected as shown below:

Column 13,
Line 4, "fist" should be -- first --
Line 6, "(1030)." should be -- (1030), --
Line 15, "booted" should be -- booted. --
Line 25, "ill" should be deleted
Line 34, "request" should be -- request. --

Column 14,
Line 23, ";" should be -- : --

Column 15,
Line 6, "farther" should be -- further --
Line 30, "number," should be -- number; --

Column 16,
Line 45, "20" should be -- 19 --

Signed and Sealed this

Twenty-sixth Day of July, 2005

JON W. DUDAS
*Director of the United States Patent and Trademark Office*